(12) United States Patent
Bender

(10) Patent No.: US 7,446,936 B2
(45) Date of Patent: Nov. 4, 2008

(54) ILLUMINATION DEVICE IN A MICROSCOPE

(75) Inventor: Claus Bender, Asslar-Werdorf (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 11/252,088

(22) Filed: Oct. 17, 2005

(65) Prior Publication Data

US 2006/0087730 A1 Apr. 27, 2006

(30) Foreign Application Priority Data

Oct. 25, 2004 (DE) ........................ 10 2004 051 940

(51) Int. Cl.
*G02B 21/06* (2006.01)
(52) U.S. Cl. ...................... 359/388; 359/381
(58) Field of Classification Search ................. 359/381, 359/385, 388, 871–883
See application file for complete search history.

(56) References Cited

U.S. PATENT DOCUMENTS

| | | | |
|---|---|---|---|
| 4,148,552 A | 4/1979 | Suzuki et al. | |
| 4,284,327 A * | 8/1981 | Kraft et al. | 359/388 |
| 6,075,643 A * | 6/2000 | Nonoda et al. | 359/385 |
| 7,206,128 B2 * | 4/2007 | Tonooka | 359/388 |
| 2002/0121610 A1 | 9/2002 | Tewes et al. | |
| 2002/0159144 A1 * | 10/2002 | Engelhardt et al. | 359/385 |

FOREIGN PATENT DOCUMENTS

| | | |
|---|---|---|
| DE | 2902961 | 8/1980 |
| DE | 4231469 | 3/1994 |
| DE | 19649605 | 6/1998 |
| WO | WO-2004077121 | 9/2004 |

* cited by examiner

*Primary Examiner*—Joshua L Pritchett
(74) *Attorney, Agent, or Firm*—Darby & Darby

(57) ABSTRACT

An illumination device in a microscope includes multiple light sources arranged on a mirror housing. A mirror is provided which is rotatably or displaceably arranged in the mirror housing for selectably switching each of the light sources into an illumination beam path. At least one drive system is provided for rotating or displacing the mirror so as to switch one of the light sources at a time into the illumination beam path.

20 Claims, 8 Drawing Sheets

ILLUMINATION DEVICE IN A MICROSCOPE

CROSS REFERENCE TO RELATED APPLICATIONS

Priority is claimed to German patent application 10 2004 051 940.4, the entire subject matter of which is hereby incorporated by reference herein.

FIELD OF THE INVENTION

The invention relates to an illumination device in a microscope, having multiple light sources that are arranged on a mirror housing and are selectably allocatable to the illumination beam path by means of a mirror in the mirror housing.

BACKGROUND OF THE INVENTION

Illumination devices of this kind are known in microscopes that, for example, image in multiple spectral regions and correspondingly comprise multiple light sources. The spectral regions can relate, for example, to the visible, the infrared, or the ultraviolet spectral region, or to spectral regions or spectral lines therein. These illumination devices contain light sources allocated to the spectral regions.

It is known for this purpose to arrange in the illumination beam path, between the actual light source and the illuminating optical system, a so-called double mirror housing on which two light sources are mounted. A hinge-mounted mirror is usually arranged for switchover between the two light sources. Manual switchover between the light sources is usually cumbersome and takes an unnecessarily long time, since the switching mechanisms are in some cases poorly accessible.

A great deal of time is furthermore lost when replacing a defective lamp, since the surroundings of the lamp, and the lamp itself, are very hot. If the second connector in a double mirror housing is unoccupied, one simply switches over to the second light source; if, however, it is occupied by a light source for a different method, work must then be interrupted until the system has cooled off.

SUMMARY OF THE INVENTION

It is therefore an object of this invention to provide an illumination device in a microscope having multiple light sources, which device makes possible a rapid, motorized switchover among multiple, specifically up to three, light sources.

The present invention provides an illumination device in a microscope having multiple light sources that are arranged on a mirror housing and are selectably allocatable to the illumination beam path by means of a mirror in the mirror housing, wherein the mirror is arranged rotatably or displaceably; and at least one drive system is provided which rotates or displaces the mirror and thereby switches in one of the light sources at a time.

In order to provide redundancy in this context, with this invention all three connectors can be occupied, the same light sources being present at two connectors. If one light source fails, it is possible to switch over immediately to the other.

This method could be automated if the functioning of the light sources were checked by means of a light sensor. If a sensor reports the failure of the one light source, a switchover to the other light source of the same kind could occur automatically by way of an intelligent activation of the motor.

As a result of the possibility of being able to remove the mirror with mirror holder from the mirror housing, that mirror can also be replaced at any time by a different mirror. If a specific investigation then also requires specific mirror coatings, a different mirror having the requisite specification (wavelength, reflection layer, color, shape, or the like) can then be inserted.

Also, in the event of damage to the mirror, the mirror no longer needs to be sent in for repair; instead, a replacement mirror merely needs to be ordered.

BRIEF DESCRIPTION OF THE DRAWINGS

The invention will be explained in more detail below with reference to the schematic drawings having FIGS. 1 to 8, in which:

FIG. 3 shows the same mirror housing from FIG. 2 with the mirror holder pivoted in;

DETAILED DESCRIPTION OF THE INVENTION

Figure 1:
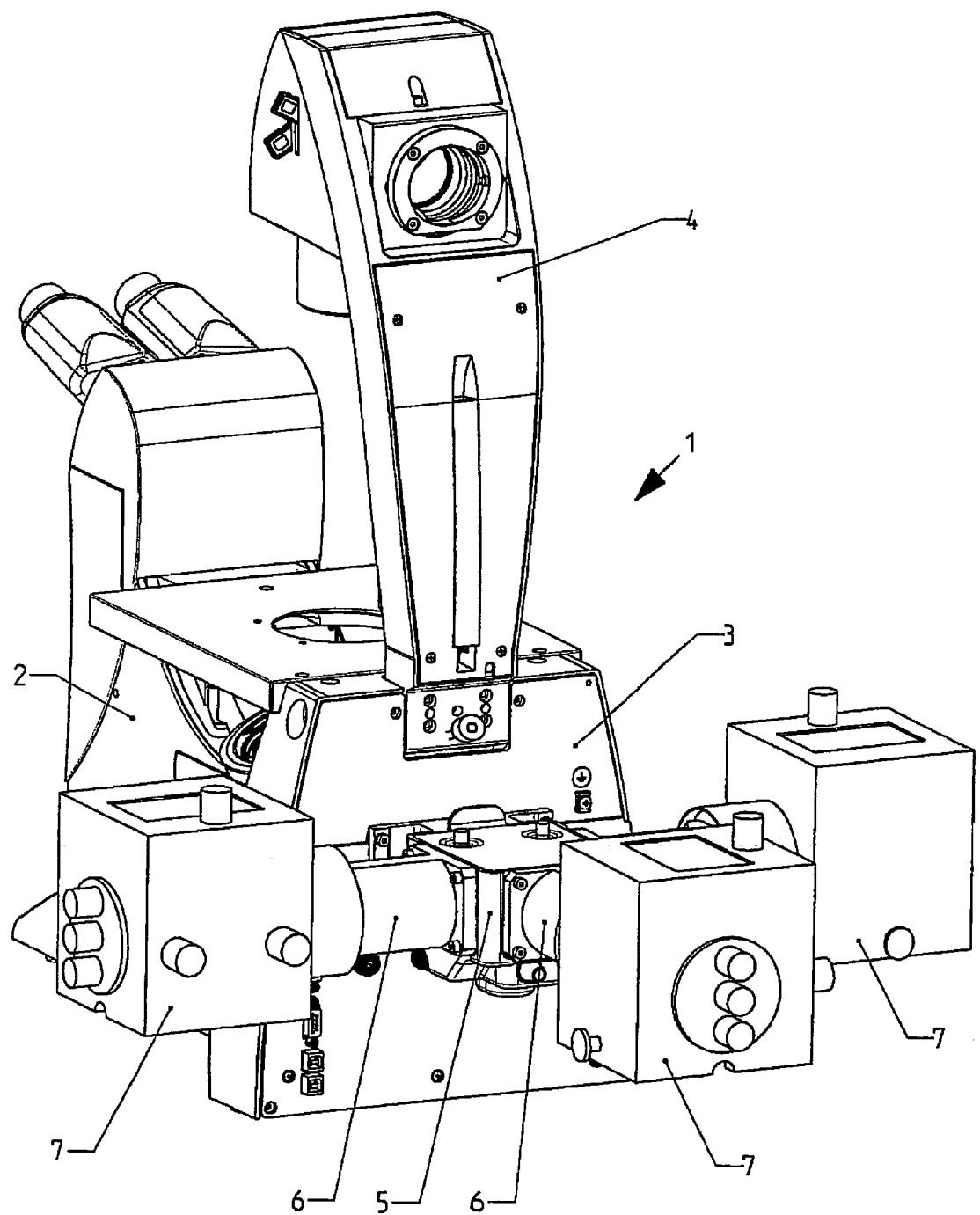
FIG. 1 shows a microscope having an illumination device with three light sources.

FIG. 1 shows a microscope 1 comprising a stand 2 having a back wall 3 and an illumination arm 4. Motorized mirror housing 5 is a stable housing and is mounted on back wall 3 in three-dimensionally oriented fashion. Up to three intermediate tubes 6, on which up to three light sources 7 can be mounted, can be mounted on mirror housing 5. In addition to the lamp housings depicted, fiber optic cables, lasers, or the like can also serve as light sources.

Intermediate tubes 6 can be made available in different lengths so that different requirements, e.g. utilization in a climate-controlled chamber, can be reacted to.

Figure 2:
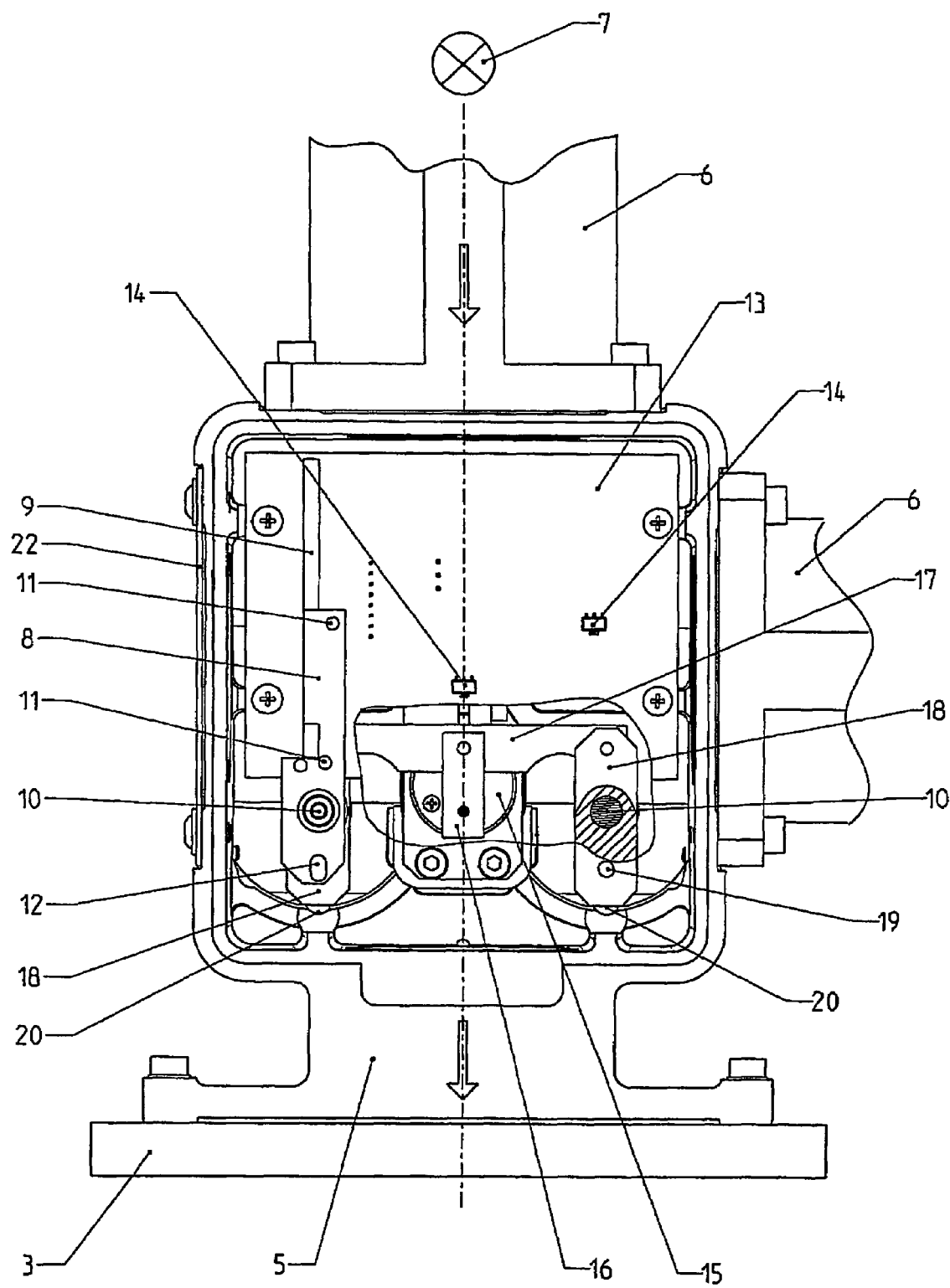
FIG. 2 shows a mirror housing having a motorized drive system.

FIG. 2 shows motorized mirror housing 5 on back wall 3 of the microscope in plan view, without the upper cover and with two intermediate tubes 6 installed. Light source 7 is depicted here only schematically. The third connection possibility for a light source is closed off by a cover panel 22.

Mirror holder 8 with mirror 9 installed is supported rotatably on a rotation shaft 10. One respective entrainment groove 12, and transducers 111 at top and bottom, are located in mirror holder 8. Transducers 11 can be embodied, for example, as magnets, vanes, etc.

Located below mirror holder 8 is a circuit board 13 having five sensors 14 and an intelligent control system. Hall sensors, photoelectric barriers, or the like can be used, for example, as sensors 14. The intelligent control system detects the sensors 14 above which transducers 11 of mirror holder 8 are located; and the instantaneous position or index position of mirror holder 8, and its switchover direction upon actuation of the switchover, are thus known.

A motor 15 having a pivot arm 16 installed effects the switchover of mirror holder 8, the pivoting motion of pivot arm 16 being transferred via a connecting part 17 to the two mirror holder receptacles 18. These mirror holder receptacles 18 are likewise rotatably mounted about rotation shafts 10, and possess at one end an entraining pin 19 that, upon the insertion of mirror holder 8, becomes inserted into its entrainment groove 12 and entrains it upon pivoting. The detent positions are implemented by way of a ball detent 20.

Figure 3:
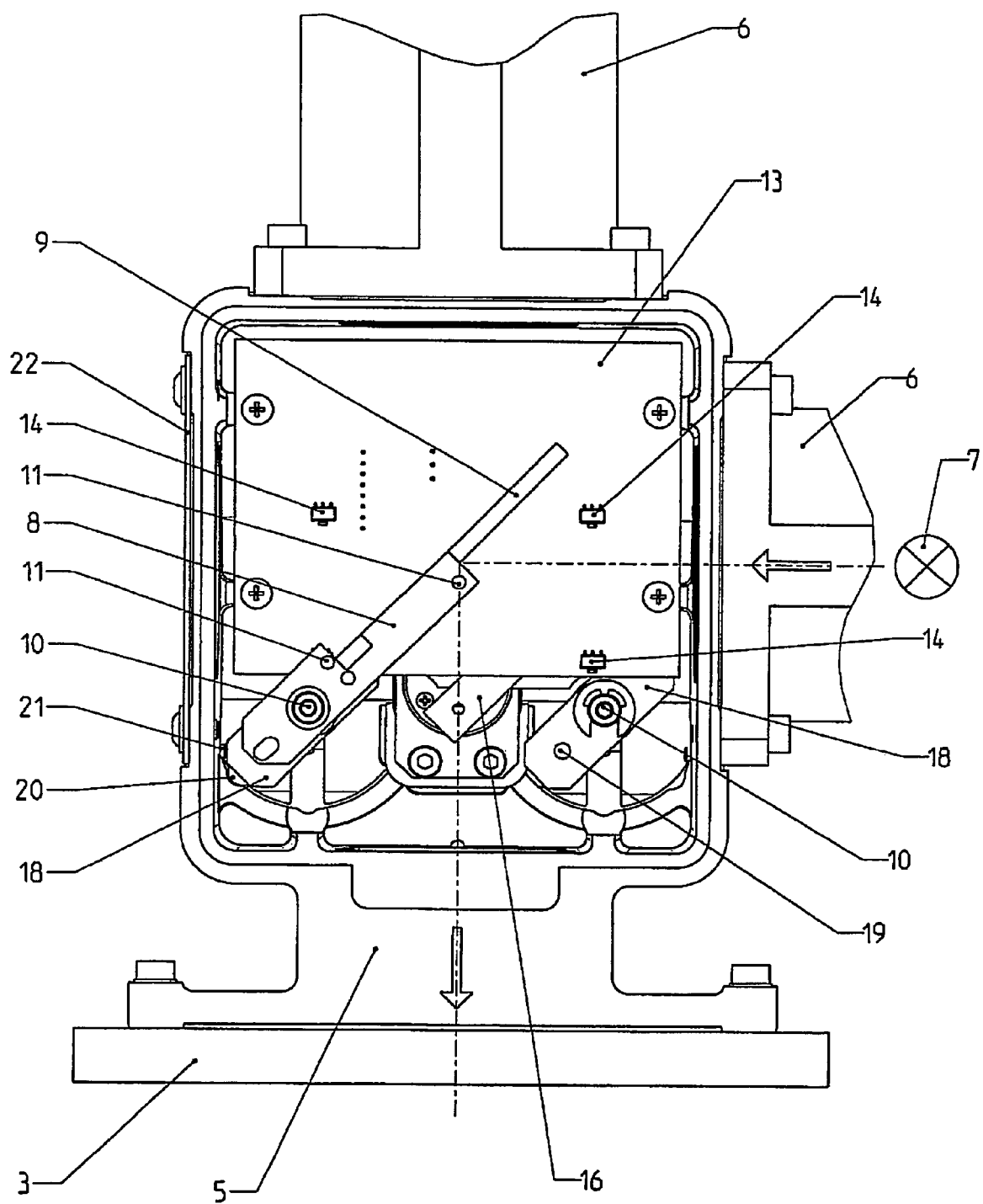

FIG. 3 shows the same motorized mirror housing 5 with mirror holder 8 pivoted in, so that the right-hand light source 7 is in use. The precise position, in this case the angle, of mirror 9 can be adjusted via an adjusting screw 21. Ball detent 20 constantly presses mirror holder receptacle 18 against adjusting screw 21.

By way of transducers 11 and the corresponding sensors 14, the intelligent control system knows the direction in which mirror holder 8 must be rotated at the next switching instruction.

Figure 4:
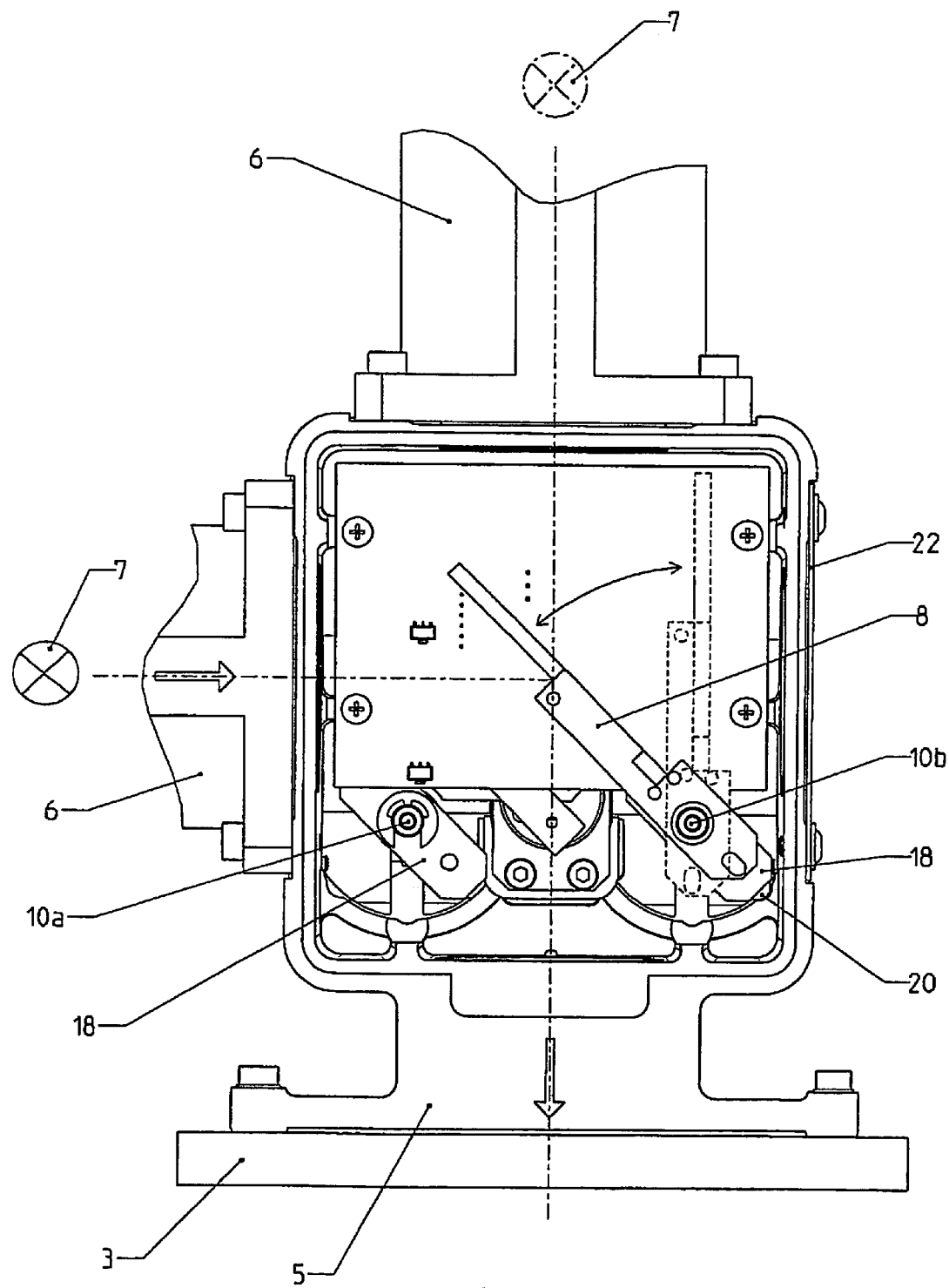
FIG. 4 shows the motorized mirror housing of FIG. 3 with the mirror holder inserted in reversed fashion.

FIG. 4 shows motorized mirror housing 5 with intermediate tube 6 and light source 7 on the left side. In order to get light from this side into the microscope, mirror holder 8 from left rotation shaft 10a must be placed in laterally reversed fashion onto right rotation shaft 10b. The intelligent control system also detects this refitting and the new position of mirror holder 8, and therefore also the next pivot direction.

The pivoting range and the pivoted-out mirror holder 8 are indicated with dashed lines in FIG. 4.

Figure 5:
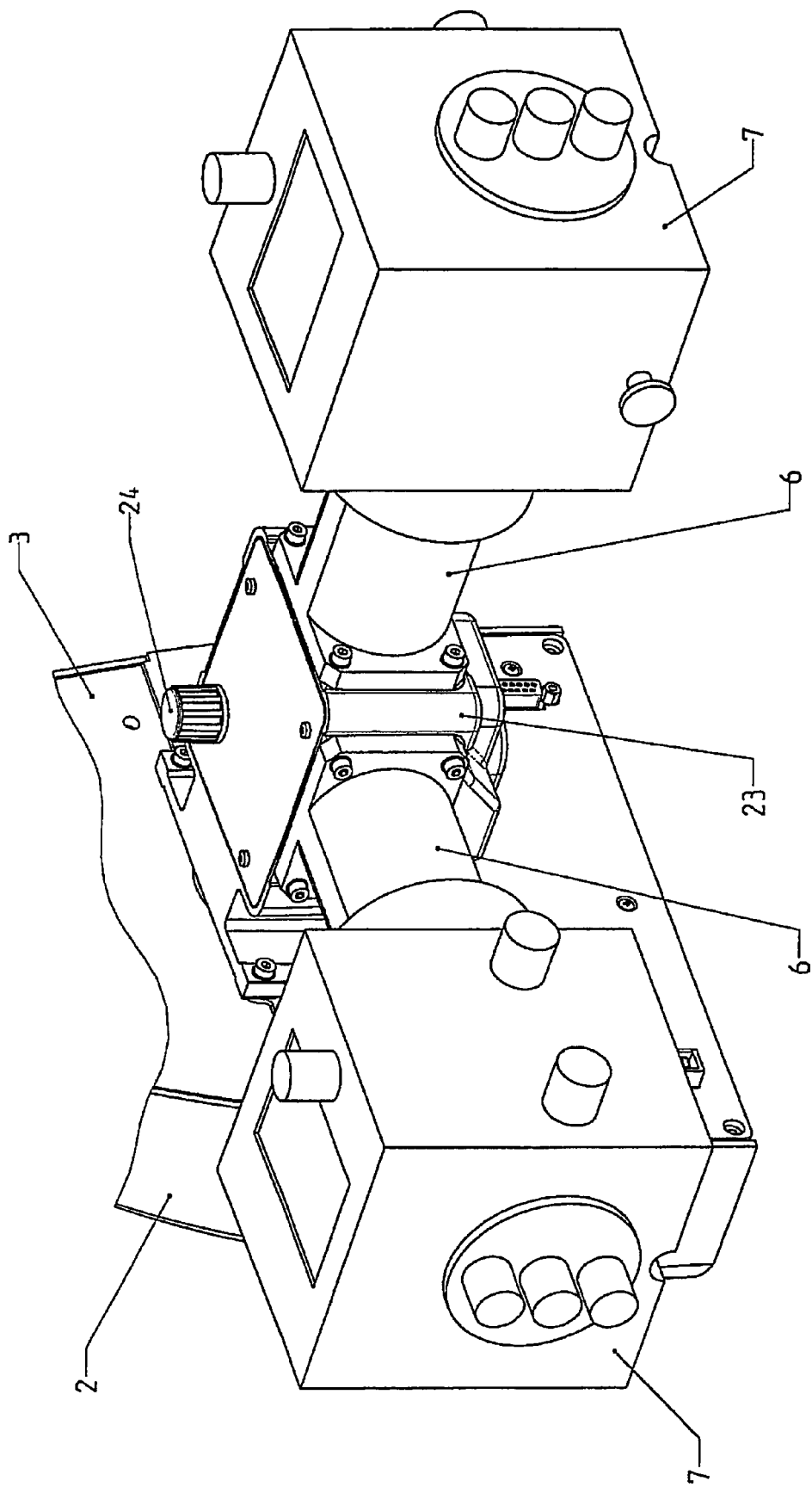
FIG. 5 is an external view of a manual mirror housing.

FIG. 5 is an external view of a manual mirror housing 23 having intermediate tubes 6 and light sources 7 on the straight and right sides. This variant is more economical than the motorized variant, but represents a less convenient solution. It could also be embodied in such a way that three connector sides are to be fitted with light sources.

The mechanical mirror housing 23, like the motorized one, is mounted in three-dimensionally oriented fashion on the back wall 3. The switchover between light sources 7 is accomplished by rotating rotary knob 24.

Figure 6:
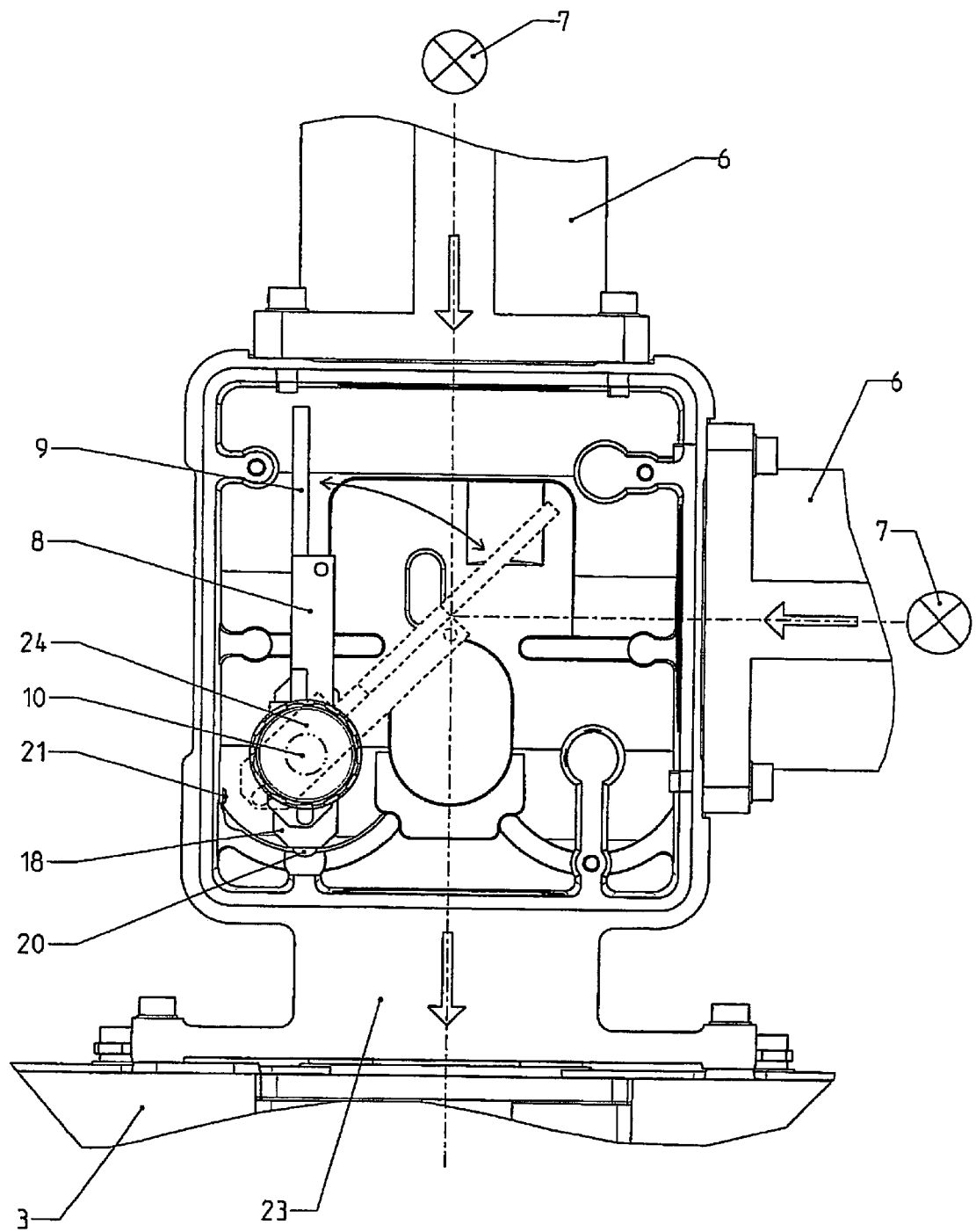
FIG. 6 shows the mechanical mirror housing of FIG. 5 without the upper cover.

FIG. 6 shows the mechanical mirror housing 23 on back wall 3 of the microscope, in plan view, without the upper cover and with two intermediate tubes 6 installed. Here as well, light source 7 is depicted only schematically.

Rotary knob 24 is joined immovably to mirror holder 8 and is located along the extension of rotation shaft 10. Mirror holder 8 is held by ball detent 20 in the respective position, and the blockage position can be precisely adjusted with adjusting screw 21.

The pivoting range and the pivoted-in mirror holder 8 are indicated with dashed lines in FIG. 6.

Figure 7:
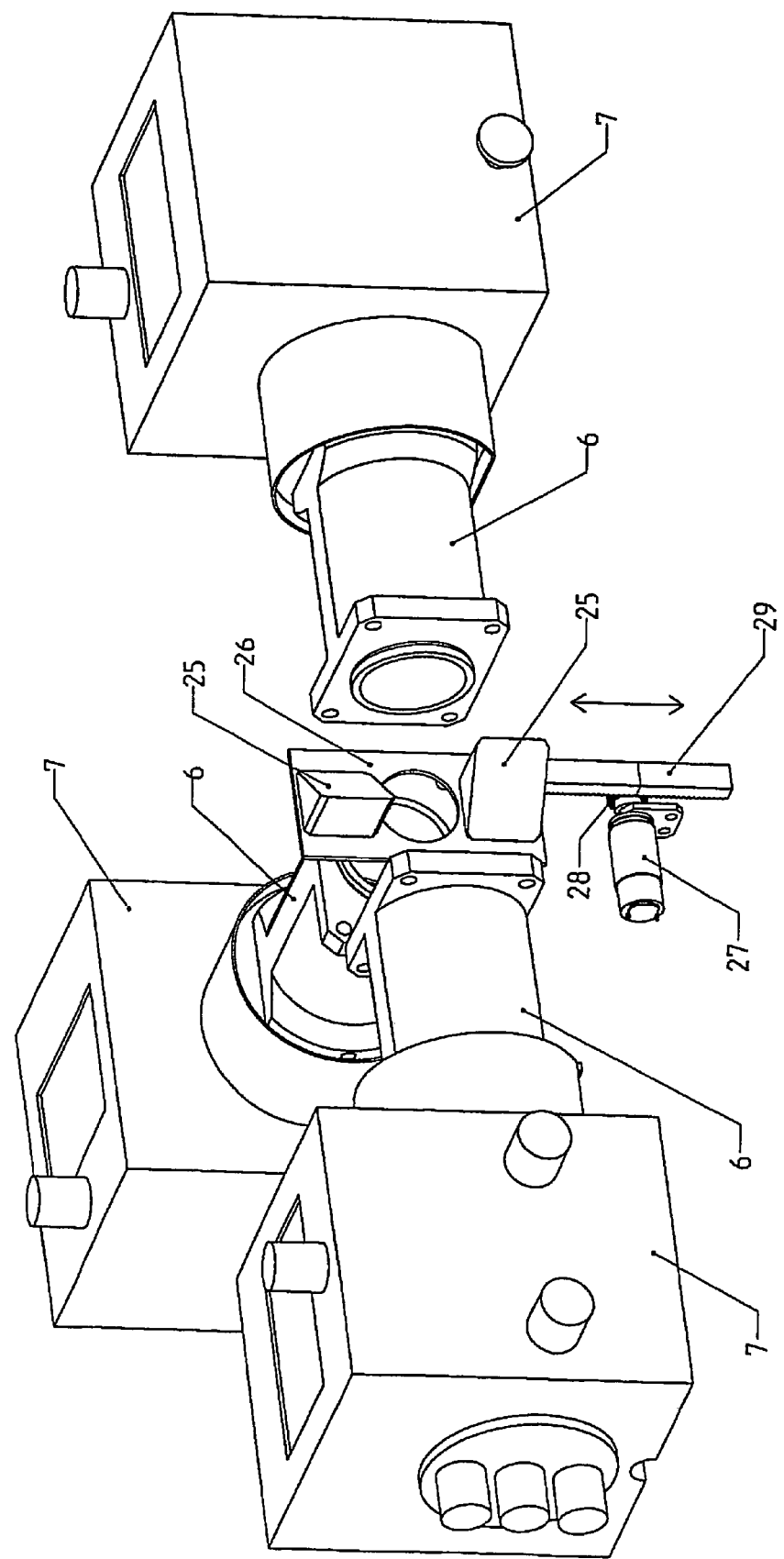
FIG. 7 shows an alternative configuration of a motorized mirror housing.

FIG. 7 shows an alternative approach to the motorized mirror housing just described, on which once again three light sources 7 having three intermediate tubes 6 can be installed simultaneously. For reasons of clarity, a depiction of the housing around the mirror housing, and the back wall of the microscope, was dispensed with.

Reflection is accomplished by way of two mirror surfaces 25 that are implemented in the present exemplifying embodiment by two prisms. The two mirror surfaces, in the present case the prisms, are mounted immovably on a displaceable platform 26. Displacement travel must be implemented and ensured by appropriate features, e.g. by a guidance system and end stops (not depicted here). A motor 27, having a pinion 28 that engages into a toothed rack 29, can serve as the displacement drive system. Displaceable platform 26 is moved upward and downward by the rotation of motor 27. The displaceable platform has a through hole in the center position in order to allow passage of the light beam of light source 7, which beam is installed in a linear alignment. Adjustment of this illumination variant is depicted in FIG. 7.

Figure 8:
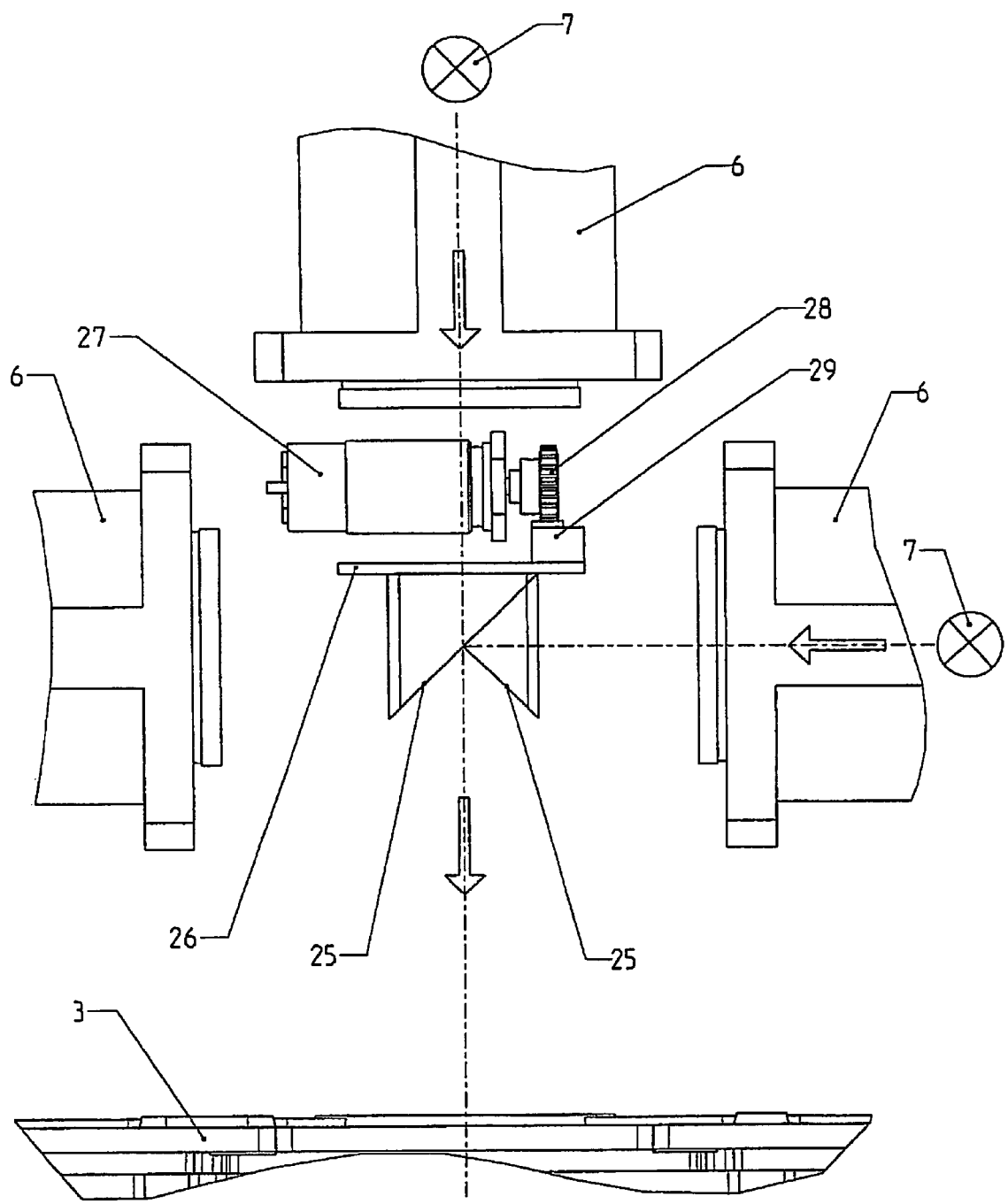
FIG. 8 shows, in plan view, the arrangement shown in FIG. 7.

FIG. 8 shows, in plan view, the arrangement shown in FIG. 7. Light sources are once again only schematically depicted here, and back wall 3 is shown in its position.

A manual displacement (not depicted here) of displaceable platform 26 can of course likewise be derived from this alternative approach.

What is claimed is:

1. An illumination device in a microscope, comprising:
    a first, a second and a third light source disposed on a mirror housing;
    a mirror rotatably disposed in the mirror housing and configured to selectably switch each of the first, second or third light sources into an illumination beam path; and
    at least one drive system configured to rotate the mirror so as to switch one of the light sources at a time into the illumination beam path,
    wherein the mirror is disposed on a rotatable mirror holder, the mirror holder including a first and a second receptacle for the mirror, the first and second receptacles being configured for reversible receiving and reinsertion of the mirror,
    wherein the mirror is rotatable between a first and second position when it is disposed in the first receptacle, in the first position the mirror switching the first light source into the illumination beam path, in the second position the mirror allowing the second light source to be switched into the illumination beam path,
    wherein the mirror is rotatable between another first and another second position when it is disposed in the second receptacle, in the another first position the mirror switching the third light source into the illumination beam path, in the another second position the mirror allowing the second light source to be switched into the illumination beam path.

2. The illumination device as recited in claim 1 wherein the at least one drive system is motorized.

3. The illumination device as recited in claim 2 further comprising at least one sensor associated with the mirror and configured to sense a current position of the mirror.

4. The illumination device as recited in claim 3 wherein the at least one sensor is configured to provide an output signal usable for providing a control signal for the drive system.

5. The illumination device as recited in claim 3 wherein the at least one sensor is configured to provide an output signal usable for providing a direction signal that indicates a direction of motion of the mirror.

6. The illumination device as recited in claim 3 wherein the at least one sensor is configured to provide an output signal including information indicating which of the first, second or third light sources is switched in to the illumination beam path.

7. The illumination device as recited in claim 3 wherein the at least one sensor is configured to monitor a functioning of the first, second or third light sources that is switched in to the illumination beam path and to provide a signal usable, based on a non-functioning or a functional disruption of the switched-in light source, to provide a control signal useable by the at least one drive system to rotate the mirror so as to switch in another of the first, second or third light sources.

8. The illumination device as recited in claim 3 further comprising a monitoring device configured to monitor a functioning of the first, second or third light source that is switched in to the illumination beam path and to provide a signal usable, based on a non-functioning or a functional disruption of the switched-in source, to provide a control signal useable by the at least one drive system to rotate the mirror so as to switch in another of the first, second or third light sources.

9. The illumination device as recited in claim 1 further comprising at least one sensor associated with the mirror and configured to sense a current position of the mirror.

10. The illumination device as recited in claim 9 wherein the at least one sensor is configured to provide an output signal usable for providing a control signal for the drive system.

11. The illumination device as recited in claim 9 wherein the at least one sensor is configured to provide an output signal usable for providing a direction signal that indicates a direction of motion of the mirror.

12. The illumination device as recited in claim 9 wherein the at least one sensor is configured to provide an output signal including information indicating which of the first, second or third light sources is switched in to the illumination beam path.

13. The illumination device as recited in claim 9 wherein the at least one sensor is configured to monitor a functioning of the first, second or third light sources that is switched in to the illumination beam path and to provide a signal usable, based on a non-functioning or a functional disruption of the switched-in light source, to provide a control signal useable by the at least one drive system to rotate the mirror so as to switch in another of the first, second or third light source.

14. The illumination device as recited in claim 9 further comprising a monitoring device configured to monitor a functioning of the first, second or third light source that is switched in to the illumination beam path and to provide a signal usable, based on a non-functioning or a functional disruption of the switched-in source, to provide a control signal useable by the at least one drive system to rotate the mirror so as to switch in another of the first, second or third light source.

15. The illumination device as recited in claim 1 wherein the mirror is manually relocatable between the first and second receptacles.

16. An illumination device in a microscope, comprising:
a first, a second and a third light source disposed on a mirror housing;
a first and a second mirror displaceably disposed in the mirror housing and configured to selectably switch each of the first and second light sources into an illumination beam path; and
at least one drive system configured to displace the first and the second mirrors so as to switch one of the light sources at a time into the illumination beam path,
wherein the first and second mirrors are disposed on a translatable platform including an aperture, the platform configured to be positioned in a first, a second and a third position, the first, second and third positions corresponding to the first mirror, the second mirror and the aperture, respectively, wherein the first position allows the first light source to be reflected into the illumination beam path, the second position allows the second light source to be reflected into the illumination beam path, and the third position allows the third light source to be switched into the illumination beam path.

17. The illumination device as recited in claim 16 wherein the first mirror includes a mirrored surface of a first prism and the second mirror includes a mirrored surface of a second prism.

18. An illumination device in a microscope, comprising:
a first, a second and a third light source disposed on a mirror housing;
a mirror rotatably disposed in the mirror housing and configured to selectably switch each of the first, second or third light sources into an illumination beam path; and
at least one drive system configured to rotate the mirror so as to switch one of the light sources at a time into the illumination beam path,
wherein the mirror is disposed on a rotatable mirror holder, the mirror holder including a first and a second receptacle for the mirror, the first and second receptacles being configured for reversible receiving and reinsertion of the mirror,
wherein the mirror is rotatable about a first axis between a first and second position when it is disposed in the first receptacle, the first axis being perpendicular to the illumination beam path, in the first position the mirror switching the first light source into the illumination beam path, in the second position the mirror allowing the second light source to be switched into the illumination beam path,
wherein the mirror is rotatable about a second axis between another first and another second position when it is disposed in the second receptacle, the second axis being perpendicular to the illumination beam path, in the another first position the mirror switching the third light source into the illumination beam path, in the another second position the mirror allowing the second light source to be switched into the illumination beam path.

19. The illumination device as recited in claim 18 further comprising at least one sensor associated with the mirror and configured to sense a current position of the mirror.

20. The illumination device as recited in claim 18 wherein the at least one sensor is configured to provide an output signal usable for providing a control signal for the drive system.

* * * * *